United States Patent
Liao et al.

(10) Patent No.: US 10,411,817 B2
(45) Date of Patent: Sep. 10, 2019

(54) ELECTRONIC DEVICE, OPERATION METHOD OF ELECTRONIC DEVICE, AND NON-TRANSITORY COMPUTER READABLE STORAGE MEDIUM

(71) Applicant: ASUSTeK COMPUTER INC., Taipei (TW)

(72) Inventors: Tzu-Chi Liao, Taipei (TW); Ten-Long Dan, Taipei (TW); Chuan-Yi Kuo, Taipei (TW); Wei-Sheng Teng, Taipei (TW); Min-Wei Pan, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 68 days.

(21) Appl. No.: 15/653,549

(22) Filed: Jul. 19, 2017

(65) Prior Publication Data

US 2018/0026732 A1    Jan. 25, 2018

Related U.S. Application Data (60) Provisional application No. 62/365,566, filed on Jul. 22, 2016.

(30) Foreign Application Priority Data

Jun. 12, 2017  (CN) .......................... 2017 1 0444993

(51) Int. Cl.
*H04B 17/318* (2015.01)
*H04B 17/23* (2015.01)
*H04W 24/08* (2009.01)

(52) U.S. Cl.
CPC ........... *H04B 17/318* (2015.01); *H04B 17/23* (2015.01); *H04W 24/08* (2013.01)

(58) Field of Classification Search
None
See application file for complete search history.

(56) References Cited

U.S. PATENT DOCUMENTS

| | | | |
|---|---|---|---|
| 2004/0142699 A1 | 7/2004 | Jollota et al. | |
| 2006/0046709 A1 | 3/2006 | Krumm et al. | |
| 2007/0168533 A1* | 7/2007 | Canright | H04L 41/12 709/230 |
| 2008/0159133 A1 | 7/2008 | Yeung et al. | |

(Continued)

FOREIGN PATENT DOCUMENTS

| | | |
|---|---|---|
| CN | 104639745 A | 5/2015 |
| CN | 105592219 A | 5/2016 |
| EP | 3048526 A1 | 7/2016 |

OTHER PUBLICATIONS

Website (http://coolking1206.pixnetnet/blog/post/57562476) published on Year 2014 and its pertinent parts.

*Primary Examiner* — Bunjob Jaroenchonwanit
(74) *Attorney, Agent, or Firm* — CKC & Partners Co., LLC (57) ABSTRACT

An electronic device is provided. The electronic device comprises a display unit and a processing unit. The processing unit is electrically connected to the display unit and is configured to perform steps including: obtaining signal strength of connections between a plurality of nodes; and controlling the display unit to display the connections graphically according to the signal strength. An operation method adapted to an electronic device, and a non-transitory computer readable storage medium is also provided.

9 Claims, 6 Drawing Sheets

(56) References Cited

U.S. PATENT DOCUMENTS

| | | | |
|---|---|---|---|
| 2010/0110932 A1* | 5/2010 | Doran | H04L 41/12 370/254 |
| 2011/0103242 A1* | 5/2011 | Hittel | H04W 24/08 370/252 |
| 2012/0149308 A1* | 6/2012 | Rothkopf | H04W 48/18 455/67.7 |
| 2015/0312833 A1* | 10/2015 | Gresset | H04W 48/17 370/329 |
| 2016/0134719 A1 | 5/2016 | Wang et al. | |
| 2017/0126728 A1* | 5/2017 | Beam | H04L 63/20 |

* cited by examiner

ELECTRONIC DEVICE, OPERATION METHOD OF ELECTRONIC DEVICE, AND NON-TRANSITORY COMPUTER READABLE STORAGE MEDIUM

CROSS-REFERENCE TO RELATED APPLICATION

This application claims the priority benefit of U.S. provisional application Ser. No. 62/365,566, filed on Jul. 22, 2016 and Chinese application serial No. 201710444993.5, filed on Jun. 12, 2017. The entirety of the above-mentioned patent applications are hereby incorporated by references herein and made a part of specification.

BACKGROUND OF THE INVENTION

Field of the Invention

The disclosure relates to an electronic device, an operation method of an electronic device and a non-transitory computer readable storage medium.

Description of the Related Art

With the development of technology, electronic devices, such as, tablet computers and smartphones, are widely used in daily life.

The electronic device can be connected to a network (such as, a wireless network and an internet of things). The network includes a plurality of network nodes. Knowing the connection condition between each node shows the quality of the connection between the electronic device and the network.

BRIEF SUMMARY OF THE INVENTION

According to an aspect of the disclosure, an electronic device is provided. The electronic device comprises a display unit and a processing unit. The processing unit is electrically connected to the display unit and is configured to perform steps including: obtaining signal strength of connections between a plurality of nodes; and displaying the connections graphically on the display unit according to the signal strength.

According to another aspect of the disclosure, an operation method adapted to an electronic device is provided. The operation method comprises: obtaining signal strength of connections between a plurality of nodes; and displaying the connections graphically according to the signal strength.

According to another aspect of the disclosure, a non-transitory computer readable storage medium is provided. The non-transitory computer readable storage medium is configured to store a program command After the program command is loaded on an electronic device, the electronic device performs steps including: obtaining signal strength of connections between a plurality of nodes; and displaying the connections graphically according to the signal strength.

In the disclosure, the signal strength of the connection between the nodes can be quickly obtained.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion.

Figure 1:
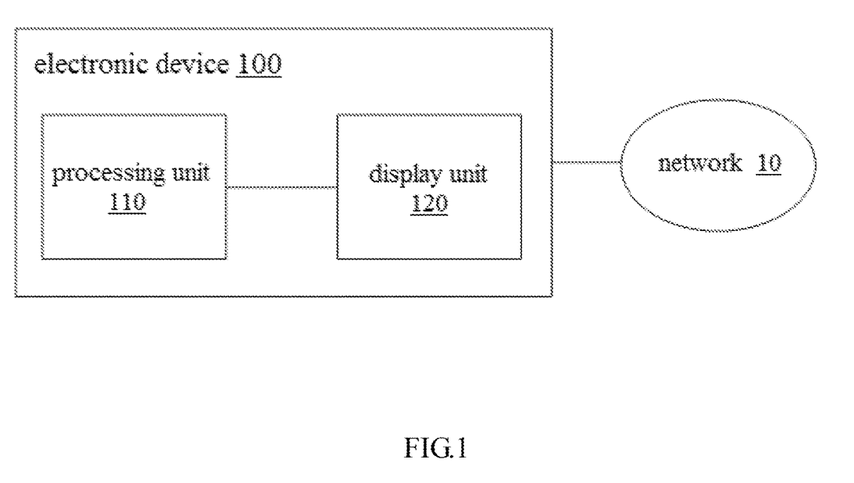
FIG. 1 is a schematic diagram showing an electronic device in an embodiment.

FIG. 1 is a schematic diagram showing an electronic device 100 in an embodiment. In an embodiment, an electronic device 100 includes a processing unit 110 and a display unit 120. In the embodiment, the processing unit 110 is electrically connected to the display unit 120.

In the embodiment, the processing unit 110 is a central processing unit (CPU) or a microprocessor. The display unit 120 is a liquid crystal display (LCD), an active matrix organic LED display, or other display units.

In an embodiment, the electronic device 100 is connected to a network 10 (such as a wireless network, an internet of things). In an embodiment, the network 10 includes a plurality of nodes. In an embodiment, the nodes in the network 10 are interconnected with each other wirelessly. In an embodiment. the electronic device 100 is connected with one or more node(s) in the network 10.

In an embodiment, the processing unit 110 is configured to obtain signal strength of the connections between the nodes in the network 10. In an embodiment, the signal strength of the connection between the nodes is a received signal strength indicator (RSSI), which is not limited herein. In an embodiment, the processing unit 110 obtains the signal strength of the connection between the nodes in the network 10 via the node connected to the electronic device 100, which is not limited herein. In an embodiment, the processing unit 110 obtains the signal strength of the connection between the nodes in the network 10 via a remote server or a CPU of the network 10.

In an embodiment, after obtaining the signal strength of the connection between the nodes in the network 10, the processing unit 110 displays the connection between the nodes graphically on the display unit 120 according to the signal strength.

In an embodiment, the processing unit 110 controls the display unit 120 to display a different graphic for different connections according to the signal strength of the different connections between the nodes in the network 10. In an embodiment, the processing unit 110 controls displays a first graphic on the display unit 120 to represent a first connection that corresponds to a first signal strength according to the first signal strength. The processing unit 110 displays a second graphic on the display unit 120 to represent a second connection that corresponds to a second signal strength according to the second signal strength. The first signal strength is different from the second signal strength, and the first graphic is different from the second graphic.

In an embodiment, the processing unit 110 controls the display unit 120 to display different graphics according to different ranges of the signal strength for different connections between the nodes in the network 10.

Please refer to table 1.

TABLE 1

| received signal strength indicator (RSSI) | signal strength | graphic |
|---|---|---|
| −30 dBm~−50 dBm | strong | three straight lines |
| −50 dBm~−70 dBm | medium | two straight lines |
| −70 dBm~−90 dBm | weak | one straight line |

In the embodiment, when the RSSI of the connection in the network 10 is in the range of −30 dBm to −50 dBm, the processing unit 110 determines that the signal strength corresponding to the connection is strong. The processing unit 110 controls the display unit 120 to display three straight lines for the connection. When the RSSI of the connection in the network 10 is in the range of −50 dBm to −70 dBm, the processing unit 110 determines that the signal strength of the connection is medium. The processing unit 110 controls the display unit 120 to display two straight lines for the connection. When the RSSI of the connection in the network 10 is in the range of −70 dBm to −90 dBm, the processing unit 110 determines that the signal strength of the connection is weak. The processing unit 110 controls the display unit 120 to display one straight line for the connection. The ranges of the signal strength mentioned above are exemplified only for description, which are not used to limit the disclosure. In an embodiment, a thick straight line represents a connection by a strong signal strength, a straight line of a medium width represents a connection by a medium signal strength, and a thin straight line represents a connection by a weak signal strength.

Figure 2A:
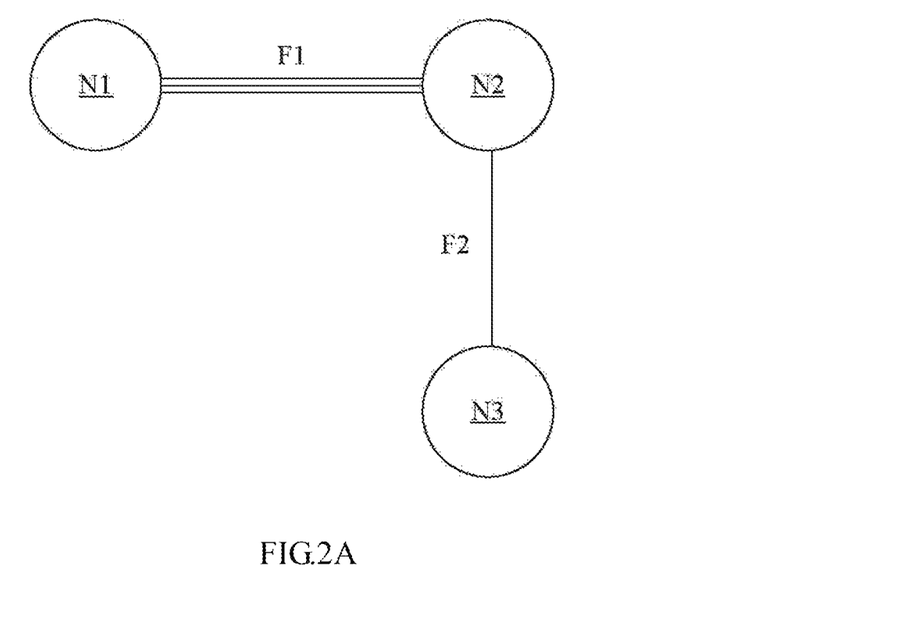
FIG. 2A and FIG. 2B are schematic diagrams showing operations of an electronic device in an embodiment.

In an embodiment, an operation of the electronic device is described hereinafter by referring to FIG. 2A.

In the embodiment, the processing unit 110 controls the display unit 120 to display a first graphic F1 (such as three straight lines) for the connection between the nodes N1 and N2 according to a first signal strength (such as, −40 dBm) between the nodes N1 and N2. The processing unit 110 controls the display unit 120 to display a second graphic F2 (such as one straight line) for the connection between the nodes N2 and N3 according to a second signal strength (such as −80 dBm) between the nodes N2 and N3.

Figure 2B:
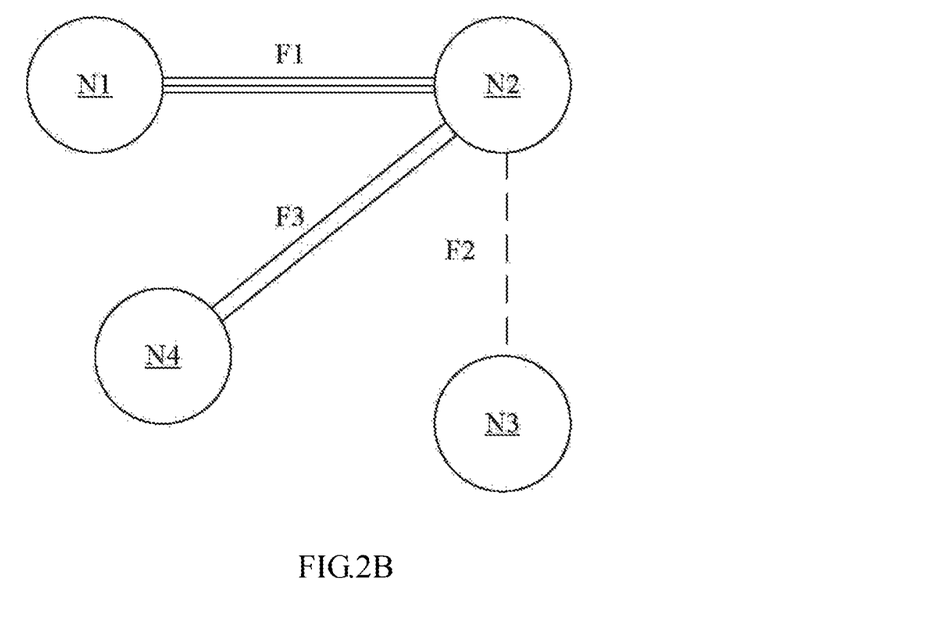

In an embodiment, an operation of the electronic device is described hereinafter by referring to FIG. 2B.

In the embodiment, the processing unit 110 controls the display unit 120 to display the first graphic F1 (such as three straight lines) for the connection between the nodes N1 and N2 according to the first signal strength (such as, −40 dBm) between the nodes N1 and N2. The processing unit 110 controls the display unit 120 to display the second graphic F2 (such as one dashed line, which represents the connection by little signal strength) for the connection between the nodes N2 and N3 according to the second signal strength (such as −120dBm) between the nodes N2 and N3. The processing unit 110 controls the display unit 120 to display a third graphic F3 (such as two straight lines) for the connection between the nodes N2 and N4 according to a third signal strength (such as, −60 dBm) between the nodes N2 and N4.

In such a way, the signal strength of the connection between the nodes are intuitively known via the electronic device 100.

In an embodiment, the processing unit 110 obtains a bandwidth usage rate of the connection between the nodes in the network 10. In an embodiment, the processing unit 110 obtains a bandwidth and traffic of the connection between the nodes in the network 10. Then, the processing unit 110 obtains the bandwidth usage rate of the connection between the nodes in the network 10 according to the bandwidth and the traffic of the connection between the nodes in the network 10.

In an embodiment, the processing unit 110 obtains the bandwidth usage rate (or the bandwidth and the traffic) of the connection between the nodes in the network 10 via the node connected to the electronic device 100. In an embodiment, the processing unit 110 obtains the bandwidth usage rate (or the bandwidth and the traffic) of the connection between the nodes in the network 10 via the remote server or the CPU of the network 10.

In an embodiment, after obtaining the bandwidth usage rate of the connection between the nodes in the network 10, the processing unit 110 displays the connection between the nodes in different colors on the display unit 120 according to the bandwidth usage rate.

In an embodiment, the processing unit 110 controls the display unit 120 to display the connections with different colors according to the different bandwidth usage rate corresponding to the different connections between the nodes in the network 10. In an embodiment, the processing unit 110 controls the display unit 120 to diaplay the first connection (that corresponds to the first bandwidth usage rate) in a first color according to the first bandwidth usage rate. The processing unit 110 controls the display unit 120 to display the second connection (that corresponds to the second bandwidth usage rate) in a second color according to the second bandwidth usage rate. The first bandwidth usage rate is different from the second bandwidth usage rate. The first color is different from the second color.

In an embodiment, the processing unit 110 controls the display unit 120 to show the connections in different colors according to the ranges of the bandwidth usage rate of the connections between the nodes in the network 10.

Please refer to table 2.

TABLE 2

| bandwidth usage rate | bandwidth usage rate | color |
|---|---|---|
| <40% | low | green |
| 40%-70% | medium | orange |
| >70% | high | red |

In the embodiment, when the bandwidth usage rate corresponding to the connection in the network 10 is less than 40%, the processing unit 110 determines that the bandwidth usage rate corresponding to the connection is "low". The processing unit 110 controls the display unit 120 to display the connection in green. When the bandwidth usage rate corresponding to the connection in the network 10 is between 40% and 70%, the processing unit 110 determines that the bandwidth usage rate corresponding to the connection is "medium". The processing unit 110 controls the display unit 120 to display the connection in orange. When the bandwidth usage rate corresponding to the connection in the network 10 is more than 70%, the processing unit 110 determines that the bandwidth usage rate corresponding to the connection is "high". The processing unit 110 controls the display unit 120 to display the connection in red. The above embodiments are exemplified only for description, which are not used to limit the disclosure.

In an embodiment, according to signal strengths and bandwidth usage rate corresponding to the different connections in the network 10, the processing unit 110 controls the display unit 120 to display the different connections between the nodes graphically and colourably. For example, different graphics in different color are displayed to represent different connections, respectively. In an embodiment, the processing unit 110 displays the first graphic in the first color on the display unit 120 to represent the first connection that corresponds to the first signal strength and the first bandwidth usage rate according to the first signal strength and the first bandwidth usage rate. The processing unit 110 displays the second graphic in the second color on the display unit 120 to represent the second connection that corresponds to the second signal strength and the second bandwidth usage rate according to the second signal strength and the second bandwidth usage rate. The first signal strength is different from the second signal strength, and the first graphic is different from the second graphic. Or the first bandwidth usage rate is different from the second bandwidth usage rate, and the first color is different from the second color.

In an embodiment, an operation of the electronic device is described hereinafter by referring to FIG. 3A.

In the embodiment, the processing unit 110 controls the display unit 120 to display the first graphic F1 (such as three straight lines) in the first color (such as red) for the connection between the nodes N1 and N2 according to the first signal strength (such as −40 dBm) and the first bandwidth usage rate (such as 80%) of the connection between the nodes N1 and N2. The processing unit 110 controls the display unit 120 to display the second graphic F2 (such as one straight line) in the second color (such as green) to for the connection between the nodes N2 and N3 according to the second signal strength (such as −80 dBm) and the second bandwidth usage rate (such as 30%) of the connection between the nodes N2 and N3.

In such a way, the signal strength and the bandwidth usage rate of the connection between the nodes are intuitively known via the electronic device 100.

In an embodiment, the processing unit 110 obtains a state (such as, in a normal service state, in a firmware updating process state or in an abnormal service state) of the nodes in the network 10. In an embodiment, the processing unit 110 obtains the states of the nodes in the network 10 via the node connected to the electronic device 100. In an embodiment, the processing unit 110 obtains the state of the nodes in the network 10 via the remote server or the CPU of the network 10.

In an embodiment, after obtaining the state of the node in the network 10, the processing unit 110 displays the state of the node on the display unit 120 graphically or colourably. In an embodiment, a circle is displayed to represent the state of the node when the node is in normal service state, and a triangle is displayed for the node when the node is in an abnormal service state. In an embodiment, the node is represented in green when the node is in a normal service state, and the node is represented in red when the node is in an abnormal service state.

In an embodiment, an operation of the electronic device is described hereinafter by referring to FIG. 3B.

In the embodiment, the processing unit 110 controls the display unit 120 to display the nodes N1 and N3 in green according to the states (such as in the normal service state) of the nodes N1 and N3. The processing unit 110 controls the display unit 120 to display the node N2 in red according to the state (such as in the abnormal service state) of the node N2. Additionally, the processing unit 110 controls the display unit 120 to display the first graphic F1 (such as three straight lines) for the connection between the nodes N1 and N2 according to the first signal strength (such as −40 dBm) of the connection between the nodes N1 and N2. The processing unit 110 controls the display unit 120 to display the second graphic F2 (such as one dashed line, which represents the connection by little signal strength) for the connection between the nodes N2 and N3 according to the second signal strength (such as −120 dBm) of the connection between the nodes N2 and N3. The processing unit 110 controls the display unit 120 to display the third graphic (such as one straight line) for the connection between the nodes N1 and N3 according to the third signal strength (such as −60 dBm) of the connection between the nodes N1 and N3.

In such a way, the signal strength and the bandwidth usage rate of the connection between the nodes would be intuitively known via the electronic device 100.

Figure 3A:
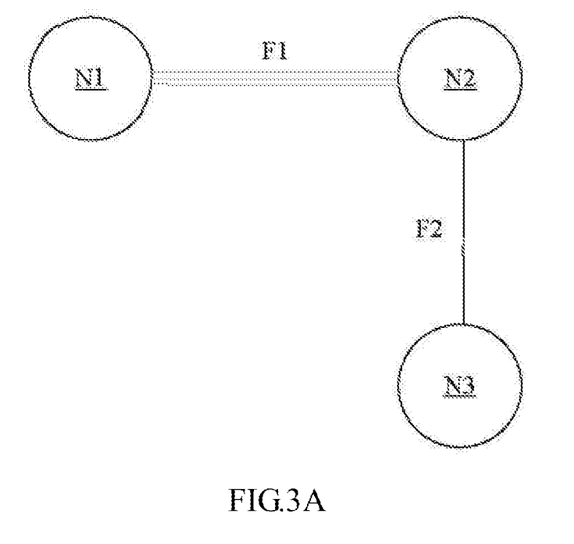
FIG. 3A and FIG. 3B are schematic diagrams showing operations of an electronic device in an embodiment.
Figure 3B:
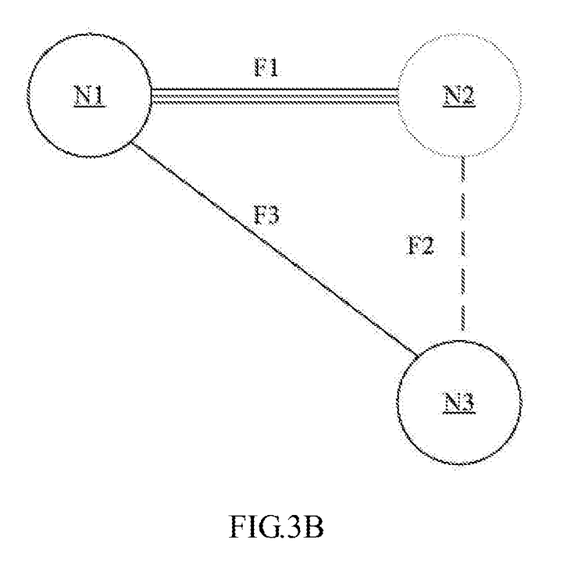

In an embodiment, the embodiment shown in FIG. 3B can be combined with the embodiment shown in FIG. 3A. That is, the processing unit 110 controls the display unit 120 to display different graphics and colors for the different connections and the different nodes according to the signal strength and bandwidth usage rate of the different connections between the nodes in the network 10 and the states of the different nodes in the network 10. Details can refer to related paragraphs mentioned above, which are not described repeatedly.

In an embodiment, in addition to show the states of the nodes in the network 10, and the signal strength and the bandwidth usage rate of the connections between the nodes, the processing unit 110 controls the display unit 120 to further display a network topology of the nodes in the network 10 graphically according to the signal strength of the connections between the nodes in the network 10.

In an embodiment, the processing unit 110 obtains a plurality of signal strength comparison values that correspond to the connections between the nodes in the network 10 respectively. In an embodiment, the node in the network 10 compares the signal strength of the corresponding connections to generate the signal strength comparison value. In an embodiment, the processing unit 110 obtains the signal strength comparison value of each node in the network 10 via the node connected to the electronic device 100. In an embodiment, the processing unit 110 obtains the signal strength comparison value of each node in the network 10 via the remote server or the CPU of the network 10.

In an embodiment, the processing unit 110 obtains the signal strength of the connections between the nodes in the network 10, and then compares the signal strength to obtain the signal strength comparison value for each node in the network 10.

In an embodiment, after the processing unit 110 obtains the signal strength comparison values that correspond to the nodes in the network 10, respectively, the processing unit 110 obtains the network topology of the nodes in the network 10 according to the signal strength comparison values. Then, processing unit 110 controls the display unit 120 to display the network topology of the nodes in the network 10 graphically according to the network topology.

Figure 4:
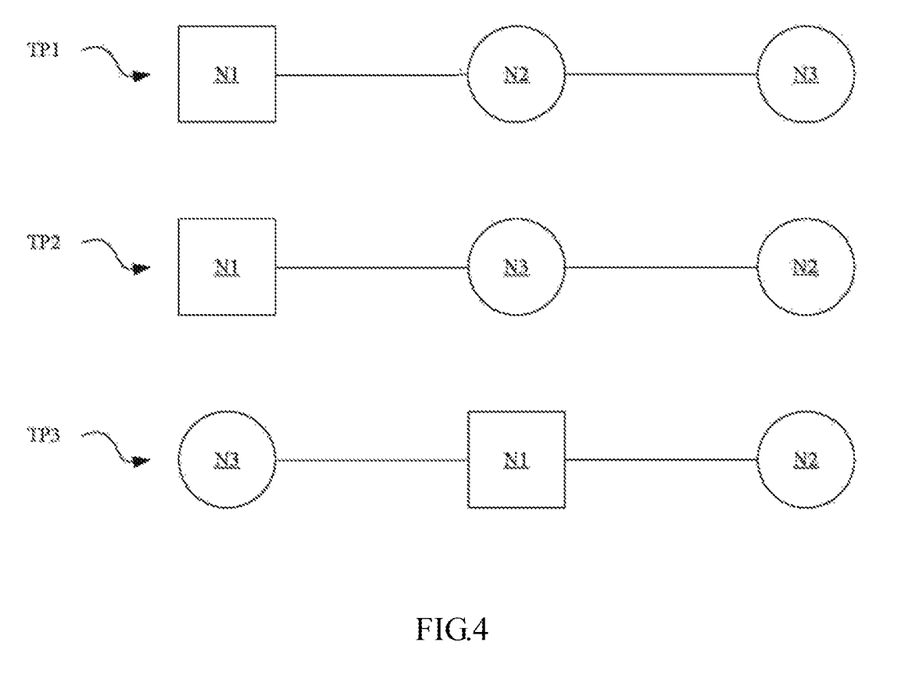
FIG. 4 is a schematic diagram showing an operation of an electronic device in an embodiment.
Figure 5:
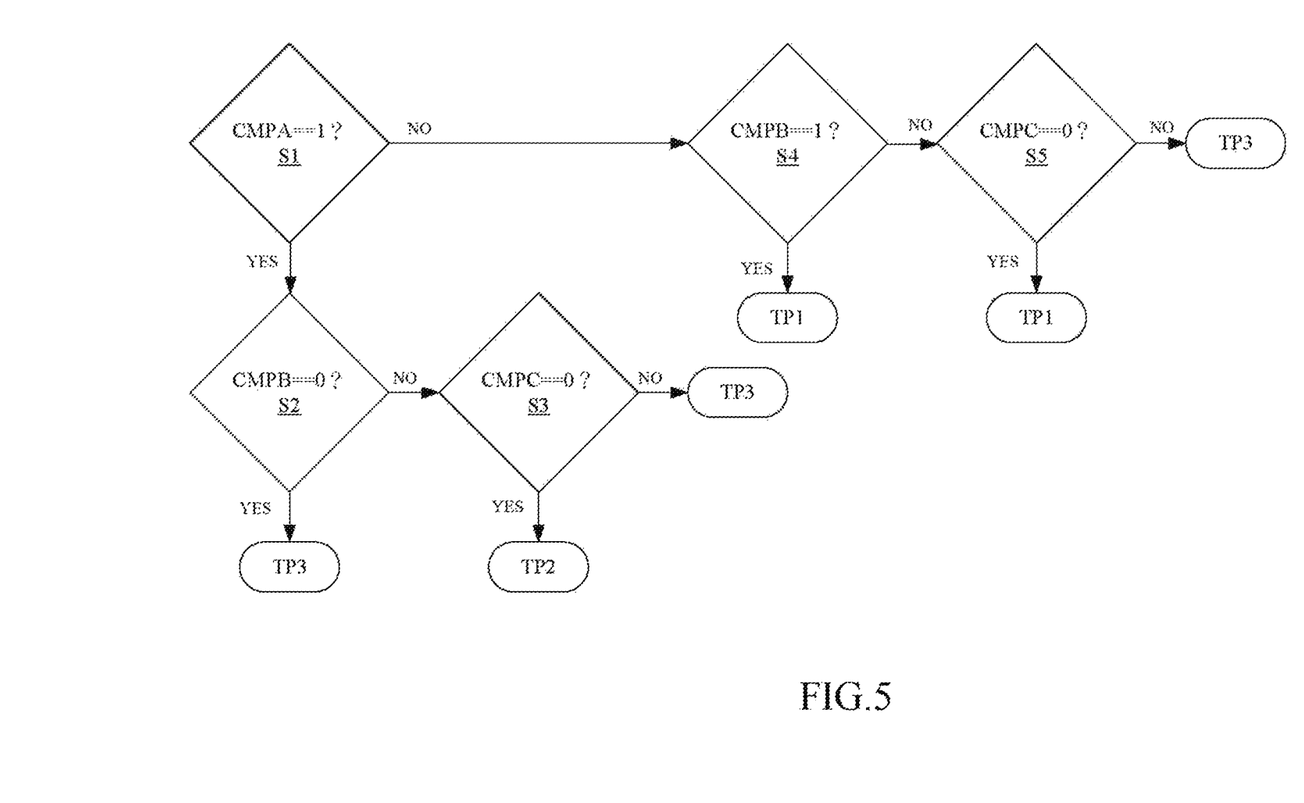
FIG. 5 is a schematic diagram showing an operation of an electronic device in an embodiment.

An embodiment is described hereinafter by referring to FIG. 4 and FIG. 5.

In an embodiment, the network 10 includes the nodes N1-N3. The electronic device 100 is connected to the nodes N1 (which is represented by a rectangle). The network topology of the nodes N1-N3 can be one of the network topologies TP1-TP3 shown in FIG. 4. An arrangement and connection relationship of the nodes N1, N2 and N3 are indicated in the network topologies TP1-TP3. In the network topology TP1, the node N2 is located between the nodes N1 and N3. In the network topology TP2, the node N3 is located between the nodes N1 and N2. In the network topology TP3, the node N1 is located between the nodes N2 and N3.

In the embodiment, each of the nodes N1-N3 compares the signal strength of the corresponding connections to generate the signal strength comparison value. In an embodiment, the node N1 compares the signal strength of the connection between the node N1 and node N3 with the signal strength of the connection between the node N1 and node N2 to determine which one of them is stronger. When the signal strength of the connection between the node N1 and node N3 is stronger than the signal strength of the connection between the node N1 and node N2, the signal strength comparison value CMPA "1" is provided to the electronic device 100. When the signal strength of the connection between the node N1 and node N3 is not stronger than the signal strength of the connection between the node N1 and node N2, the signal strength comparison value CMPA "0" is provided to the electronic device 100. The node N2 compares the signal strength between the node N2 and the node N3 with the signal strength between the node N2 and the node N1 to determine which one of them is stronger. When the signal strength between the node N2 and the node N3 is stronger than the signal strength between the node N2 and the node N1, the signal strength comparison value CMPB "1" is provided to the electronic device 100. When the signal strength between the node N2 and the node N3 is not stronger than the signal strength between the node N2 and the node N1, the signal strength comparison value CMPB "0" is provided to the electronic device 100. The node N3 compares the signal strength between the nodes N3 and N1 with the signal strength between the nodes N3 and N2 to determine whether which one of them is stronger. When the signal strength between the nodes N3 and N1 is stronger than the signal strength between the nodes N3 and N2, the signal strength comparison value CMPC "1" is provided to the electronic device 100. When the signal strength between the nodes N3 and N1 is not stronger than the signal strength between the nodes N3 and N2, the signal strength comparison value CMPC "0" is provided to the electronic device 100.

In step S1, the processing unit 110 determines whether the signal strength comparison value CMPA corresponding to the node N1 is 1. When the signal strength comparison value CMPA corresponding to the node N1 is 1, then step S2 is performed. When the signal strength comparison value CMPA corresponding to the node N1 is not 1, step S4 is performed.

In step S2, the processing unit 110 determines whether the signal strength comparison value CMPA corresponding to the node N2 is 0. When the signal strength comparison value CMPA corresponding to the node N2 is 0, the processing unit 110 determines that the network topology of the nodes N1-N3 is the network topology TP3. When the signal strength comparison value CMPA corresponding to the node N2 is not 0, step S3 is performed.

In step S3, the processing unit 110 determines whether the signal strength comparison value CMPA corresponding to the node N3 is 0. When the signal strength comparison value CMPA corresponding to the node N3 is 0, the processing unit 110 determines that the network topology of the nodes N1-N3 is the network topology TP2. When the signal strength comparison value CMPA corresponding to the node N3 is not 0, the processing unit 110 determines that the network topology of the nodes N1-N3 is the network topology TP3.

In step S4, the processing unit 110 determines whether the signal strength comparison value CMPA corresponding to the node N2 is 1 When the signal strength comparison value CMPA corresponding to the node N2 is 1, the processing unit 110 determines that the network topology of the nodes N1-N3 is the network topology TP1. When the signal strength comparison value CMPA corresponding to the node N2 is not 1, step S5 is performed.

In step S5, the processing unit 110 determines whether the signal strength comparison value CMPA corresponding to the node N3 is 0. When the signal strength comparison value CMPA corresponding to the node N3 is 0, the processing unit 110 determines that the network topology of the nodes N1-N3 is the network topology TP1. When the signal strength comparison value CMPA corresponding to the node N3 is not 0, the processing unit 110 determines that the network topology of the nodes N1-N3 is the network topology TP3.

In such a way, the processing unit 110 determines the network topology of the nodes N1-N3 is which of the network topologies TP1-TP3 according to the signal strength between the nodes N1-N3. Then, the processing unit 110 controls the display unit 120 to display the network topology of the nodes N1-N3.

The values and the comparison method are exemplified only for description. In an embodiment, the values and the comparison method are changed according to the requirements.

Figure 6:
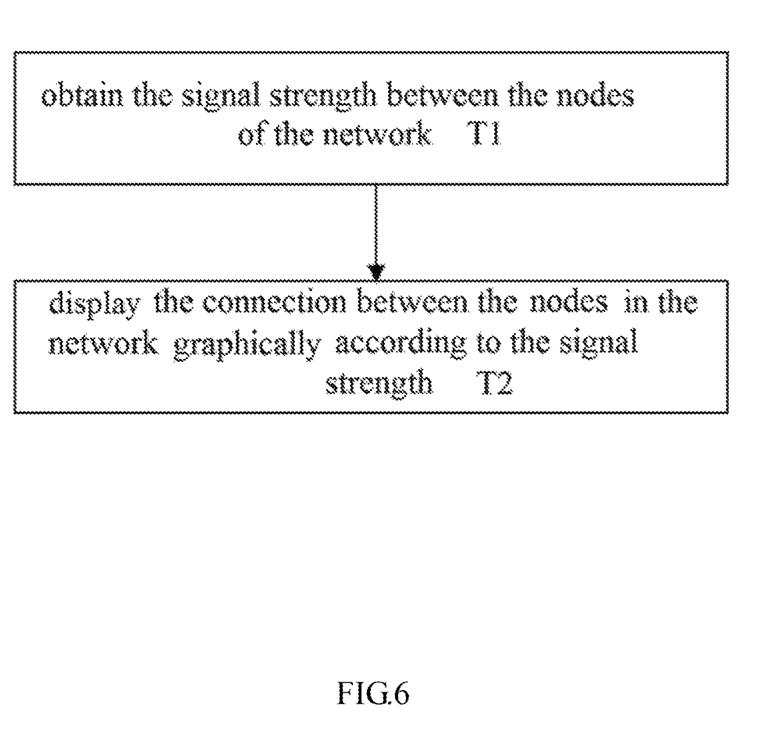
FIG. 6 is a flow chart of an operation method of an electronic device in an embodiment.

Details of the disclosure are further described by referring to FIG. 6 where an operation method of an electronic device is provided in an embodiment.

FIG. 6 is a flow chart of an operation method 200 of an electronic device in an embodiment. In an embodiment, an operation method 200 is implemented via a non-transitory computer readable storage medium. At least a program command is stored in the non-transitory computer readable storage medium. After the program command is loaded on an electronic device, following steps are performed (by the electronic device). In an embodiment, the non-transitory computer readable storage medium is a read-only memory, a flash memory, a soft disk, a hard disk, a compact disk, a mobile storage device, a tape, a database that can be accessed via the network, or another non-transitory computer readable storage mediums. In an embodiment, the operation method 200 is applied in an electronic device similar to the electronic device in FIG. 1. In the following embodiment, the method is performed by the electronic device 100 shown in FIG. 1, which is not limited herein.

It should be noted that unless mentioned otherwise, the sequence of the steps of the operation method 200 can be changed according to the requirements. In an embodiment, all/part of the steps are performed simultaneously.

In embodiments, some steps can be added, replaced or cancelled according to requirements.

In the embodiment, the operation method 200 includes following steps.

In step T1, the processing unit 110 obtains the signal strength between the nodes of the network 10.

In step T2, the processing unit 110 controls the display unit 120 to graphically display the connection between the nodes in the network 10 according to the signal strength.

Details for the method 200 can refer to the related paragraphs mentioned above, which are not repeated herein.

In such a way, the signal strength of the connection between the nodes would be intuitively known to the user via the electronic device.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device comprising:
   a display unit; and
   a processing unit electrically connected to the display unit and configured to perform steps of:
   obtaining signal strength of connections between a plurality of nodes; and
   displaying the connections graphically on the display unit according to the signal strength;
   obtaining a plurality of signal strength comparison values that correspond to the nodes, respectively;
   obtaining a network topology of the nodes according to the signal strength comparison values; and
   displaying the network topology of the nodes graphically on the display unit;
   wherein the signal strength comparison values are provided to be 1 or 0.

2. The electronic device according to claim 1, wherein the processing unit is further configured to perform steps including:
   displaying a first graphic on the display unit to represent a first connection that corresponds to a first signal strength according to the first signal strength in the signal strengths, and
   displaying a second graphic on the display unit to represent a second connection that corresponds to a second signal strength according to the second signal strength in the signal strength,
   wherein, the first signal strength is different from the second signal strength, and the first graphic is different from the second graphic.

3. The electronic device according to claim 1, wherein the processing unit is further configured to perform steps including:
   obtaining bandwidth usage rates of the connections; and
   displaying the connections in colors on the display unit according to the bandwidth usage rates.

4. The electronic device according to claim 3, wherein the processing unit is further configured to perform steps of:
   displaying a first connection that corresponds to a first bandwidth usage rate in a first color on the display unit; and
   displaying a second connection that corresponds to a second bandwidth usage rate in a second color on the display unit;
   wherein, the first bandwidth usage rate is different from the second bandwidth usage rate, and the first color is different from the second color.

5. An operation method of an electronic device, the operation method comprising:
   obtaining signal strength of connections between a plurality of nodes;
   displaying the connections graphically according to the signal strength;
   obtaining a plurality of signal strength comparison values that correspond to the nodes, respectively;
   obtaining a network topology of the nodes according to the signal strength comparison values; and
   displaying the network topology of the nodes graphically;
   wherein the signal strength comparison values are provided to be 1 or 0.

6. The operation method according to claim 5, wherein the operation method further comprises:
   displaying a first graphic to represent a first connection that corresponds to a first signal strength according to the first signal strength in the signal strength, and
   displaying a second graphic to represent a second connection that corresponds to a second signal strength according to the second signal strength in the signal strength,
   wherein, the first signal strength is different from the second signal strength, and the first graphic is different from the second graphic.

7. The operation method according to claim 5, wherein the operation method further comprises:
   obtaining bandwidth usage rates of the connections; and
   displaying the connections in colors according to the bandwidth usage rates.

8. The operation method according to claim 7, wherein the operation method further comprises:
   displaying a first connection in a first color, the first connection in the connections is corresponding to a first bandwidth usage rate in the bandwidth usage rates; and
   displaying a second connection in a second color, the second connection in the connections is corresponding to a second bandwidth usage rate in the bandwidth usage rates,
   wherein, the first bandwidth usage rate is different from the second bandwidth usage rate, and the first color is different from the second color.

9. A non-transitory computer readable storage medium, configured to store a program command, after the program command is loaded on an electronic device, the electronic device performs steps of:
   obtaining signal strength of connections between a plurality of nodes;
   displaying the connections graphically according to the signal strength;
   obtaining a plurality of signal strength comparison values that correspond to the nodes, respectively;
   obtaining a network topology of the nodes according to the signal strength comparison values; and
   displaying the network topology of the nodes graphically;
   wherein the signal strength comparison values are provided to be 1 or 0.

* * * * *